May 12, 1942.　　　H. C. HILL　　　2,282,517
TRANSMISSION
Filed Nov. 16, 1940
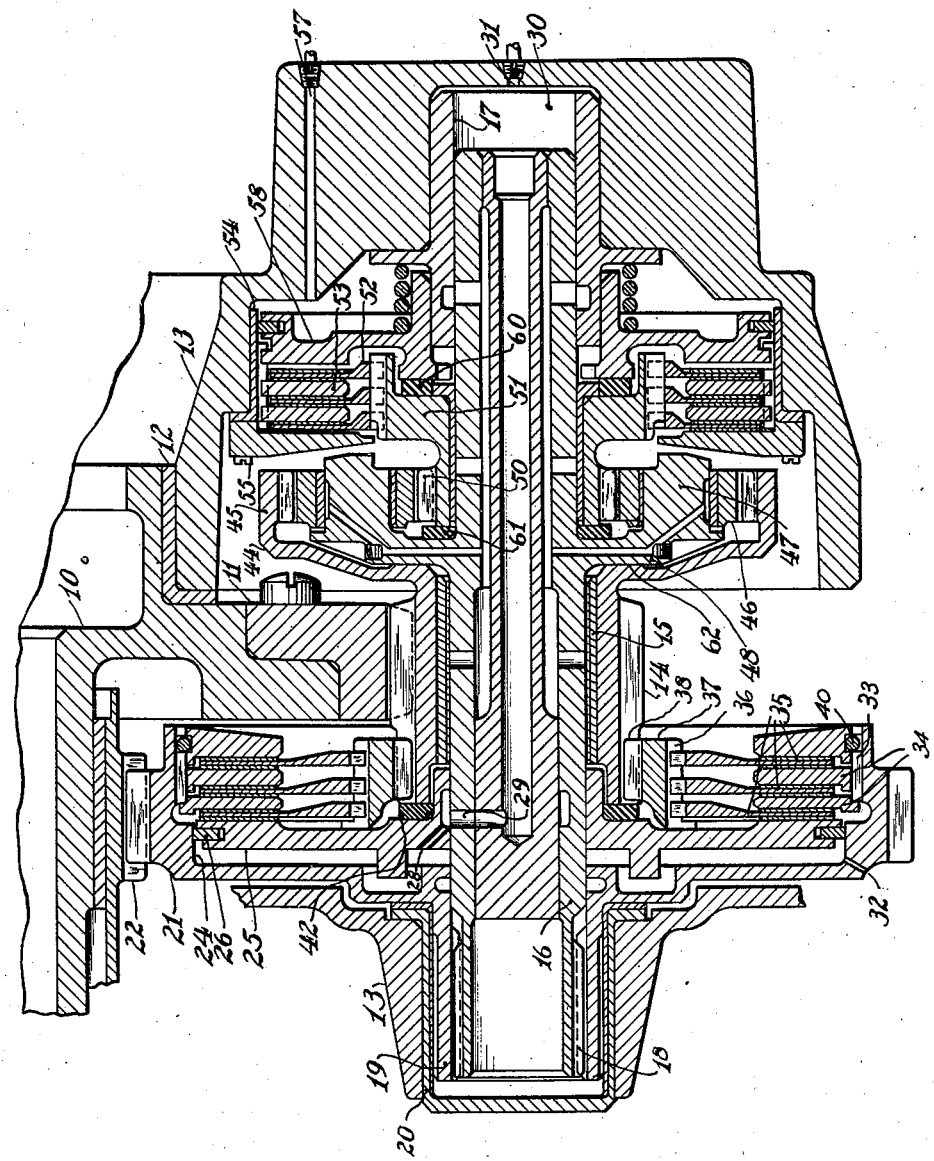
Henry C. Hill.
INVENTOR

Patented May 12, 1942

2,282,517

UNITED STATES PATENT OFFICE 2,282,517

TRANSMISSION

Henry C. Hill, Montclair, N. J., assignor to Wright Aeronautical Corporation, a corporation of New York Application November 16, 1940, Serial No. 365,979

8 Claims. (Cl. 74—290)

This invention relates to change speed gearing and is particularly concerned with improvements in a speed shifting mechanism involving friction clutches by which changes in speed of the gearing are effected.

In the aircraft engine art a supercharger is ordinarily used whose impeller is geared to rotate at greater than crankshaft speed and in modern engines it is desirable to provide more than one available gear ratio for the impeller drive. The assembly thus characterized is known as a two-speed supercharger and examples of two-speed supercharger drives which have been found successful in practice are depicted in Chilton Patents Nos. 2,034,087, issued March 17, 1936, and 2,101,239, issued December 7, 1937. The supercharger drive according to the present invention is broadly of the same character as those shown in the Chilton patents. In general, the assembly consists of a layshaft for a pinion driven by a crankshaft gear, the layshaft carrying a gear engaged with a supercharger impeller pinion concentric with the crankshaft. Means are provided on the layshaft to change the drive ratio selectively between the crankshaft gear and the supercharger pinion.

Ratio shifting in such a gearset must be accomplished under load so that multi-plate friction clutches are utilized to engage or disengage each ratio. In practical forms of the invention at least one of these clutches rotates bodily at fairly high speed and with it the hydraulic actuating cell also rotates. When pressure fluid such as lubricating oil is valved to one of the pressure cells, its associated clutch is engaged. When it is desired to disengage the clutch, fluid pressure is relieved from the cell; but, due to the high speed of rotation of the cell, centrifugal force maintains fluid pressure in the cell tending to hold the clutch in engagement. Accordingly, means are provided to relieve this pressure due to centrifugal force by leakage openings at the periphery of the cell. This mode of unloading a clutch is ordinarily satisfactory but at times, sludge and foreign matter may accumulate in the hydraulic cell due to centrifuging action and restrict the small peripheral leakage openings whereby unloading of the clutch is hampered. This can happen particularly if the clutch is held in engagement for an extended period of time whereupon there is little turbulence of the fluid in the hydraulic cell.

This invention has for an object the provision of means to positively release a rotating clutch assembly, in spite of any tendencies which may exist toward the prevention of clutch disengagement.

A further object of the invention is to provide a pair of friction clutches each of which is forced into driving engagement by a hydraulic cell while, at the same time, that clutch to be disengaged is positively disengaged by the engaging action of the other clutch.

A further object of the invention is to provide a pair of spaced clutches in gearing which shall be positively and inversely operable—that is, one shall be positively disengaged while the other is positively engaged. It is appreciated that dog clutch mechanisms have been operated in the foregoing manner but it is believed that this is the first instance in which plate type friction clutches have been inversely operated.

Further objects of the invention will become apparent in reading the subjoined detailed description in connection with the drawing, in which:

The figure is a longitudinal section through an arrangement of a two-speed gearing system embodying the invention.

I show a driving member 10, which may be an engine crankshaft, toward one end of which is secured a driving gear 11, the shaft 10 being piloted in a bearing 12 mounted in a housing 13. The gear 11 meshes with a pinion 14 borne at 15 on a layshaft 16, the layshaft being borne at its righthand end in a bearing 17 and housing 13, and splined at its lefthand end, as at 18, to a gear hub 19 borne in a bearing 20 in the housing 13. The gear hub 19 carries a layshaft gear 21 meshed with a supercharger impeller pinion 22 piloted on and rotatable with respect to the shaft 10.

The interior of the gear 21 is formed as a cylinder 24 within which is engaged a piston 25 sealed to the cylinder by a ring 26, said piston closely fitting the layshaft 16 and having a drilling 28 communicating with a radial and longitudinal passage 29 within the layshaft opening to the end of the layshaft at its righthand end whereat there is a chamber 30 having an opening 31 to which pressure fluid may be fed. The interior of the rim of the gear 21 is provided with a leakage hole 32, and splines 33 on which clutch plates 34 are slidably fitted, these clutch plates alternating with clutch plates 35 splined at 36 to an annular spacer 37 splined at 38 to the pinion teeth 14. A lock wire 40 engages the righthand clutch plate 34 and the gear rim to hold that plate from axial displacement with respect to the gear. It will be apparent that if pressure fluid is admitted to the cylinder 24, the piston 25 will enforce driving engagement between the clutch plates 34 and 35 to afford direct drive from the pinion 14 to the gear 21. A spacer 42 is disposed between the righthand end of the piston 25 and the lefthand end of the pinion 24 so that, as the piston is moved to the right under the influence of hydraulic pressure, the pinion 14 will also be moved to the right for the purpose which will shortly become apparent.

The righthand end of the pinion 14 carries an integral web 44 having an integral ring gear 45, the gear teeth of which are engaged with planet pinions 46 carried on journals 47 on a spider 48 integral with the layshaft 16. The inner runs of the pinions 46 engage a sun pinion 50 integral with a hub 51 to which brake plates 52 are splined. Alternate brake plates 53 are splined to a brake shell 54 rigid with the housing 13, the lefthand brake plate 53 being secured to the housing as at 55. The righthand end of the brake housing 54 comprises, with the housing 13, a hydraulic cylinder to which pressure fluid may be selectively directed through a housing drilling 57. This hydraulic pressure acts upon a piston 58 fitted to the cylinder which presses the several brake plates 52 and 53 to lock the sun pinion 50 against rotation. A spacer ring 60 is fitted between the piston 58 and the hub 51, and a spacer ring 61 is fitted between the lefthand end of the sun pinion 50 and the righthand face of the spider 48. The lefthand face of the spider 48 is in contact at 62 with the righthand face of the shaft of the pinion 14.

When the brake involving the plates 52 and 53 is engaged and when the clutch involving the plates 34 and 35 is disengaged, the ring gear 45, integral with the pinion 14, drives the spider 48 and the layshaft 16 at reduced speed, the drive reaction falling on the sun pinion 50 which is locked from rotation. Thus, the impeller drive gear 21, rotating with the layshaft 16 is driven at a lower rate than that afforded by direct drive from the pinion 14 to the gear 21 through the clutch 34, 35. Now, when the brake 52, 53 is engaged, the piston 58 is moved leftwardly. This leftward movement enforces bodily axial movement, to the left, of the elements 60, 51, 61, 48, 14, 42, and 25, thus collapsing the clutch cell 24, 25, and positively disengaging the clutch 34, 35. A surplus of pressure fluid is supplied to the cell defined by the piston 58 and the housing 13 which may leak slowly past the piston edges. Contrarily, when fluid pressure is admitted to the cylinder 24, the clutch 34, 35 is engaged, the piston 25 moves toward the right and enforces rightward movement of the following elements: 42, 14, 48, 61, 51, 60, and 58. Pressure fluid in the cylinder 24 leaks, during operation, through the leak hole 32, and when the clutch 34, 35 is positively disengaged, fluid in the cylinder 24 scavenges through the leak hole.

It will be noted that in the right and lefthand axial shift of the layshaft and the elements thereon, these elements have rotation relative to one another and the thrust faces therebetween must be adequately lubricated which lubrication is taken care of by feed of oil through various appropriate passages to the parts.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a gear system, a shaft having a pinion floatingly mounted for rotation and axial shift, a drive gear engaging said pinion, a two-speed gearset driven by said pinion, means to shift said pinion axially, and means responsive to axial shift of said pinion to select one or the other drive ratio of said gearset.

2. In a gear system, a shaft having a member floatingly mounted thereon for rotation and axial shift, means to drive said member, a gear on the shaft, a speed reducer on the shaft, a pair of friction drive assemblies connected to one another through said speed reducer and member, and means for engaging said assemblies selectively, engagement of one assembly enforcing disengagement of the other through said member and speed reducer.

3. In a gear system, a pair of spaced friction drive assemblies each having an axially fixed element and an axially movable element, means securing the axially movable elements for relative rotation and for joint axial reciprocation, said reciprocation operating said assemblies inversely as to engagement and disengagement, means driving said securing means rotationally and relative to said elements, and a separate device driven by said securing means as a result of engagement of respective assemblies.

4. In gearing, a shaft having thereon a plurality of relatively movable elements in end-to-end abutment, means on each end of said plurality to push the plurality away from it, and a friction drive assembly interposed between each end and the corresponding means, whereby one assembly is disengaged positively during engagement of the other under the action of each said pushing means.

5. In gearing, a shaft having thereon a driven element and other elements rotatable therewith and with respect thereto, certain of said elements being in end-to-end engagement and being bodily and jointly movable in an axial direction upon imposition of thrust at an end of the group of certain elements, a hydraulic cell at each end of said group, and actable thereon, and means selectively operable to impose fluid pressure on one or the other cell.

6. In gearing, a shaft having thereon a driven element and other elements rotatable therewith and with respect thereto, certain of said elements being in end-to-end engagement and being bodily and jointly movable in an axial direction upon imposition of thrust at an end of the group of certain elements, a hydraulic cell at each end of said group, and actable thereon, means selectively operable to impose fluid pressure on one or the other cell, and friction drive assemblies having elements coupled through said group, inversely operable upon actuation of one or the other hydraulic cell.

7. In gearing, a shaft having thereon a driven element and other elements rotatable therewith and with respect thereto, certain of said elements being in end-to-end engagement and being bodily and jointly movable in an axial direction upon imposition of thrust at an end of the group of certain elements, a hydraulic cell at each end of said group, and actable thereon, means selectively operable to impose fluid pressure on one or the other cell, friction drive assemblies having elements coupled through said group, inversely operable upon actuation of one or the other hydraulic cell, and means driven by said member, through one or the other of said assemblies.

8. In a two speed gearset, a shaft having a concentric rotatable drive element thereon, a driven member secured to the shaft, a friction clutch between said element and member including a clutch operating member axially movable with and rotatable with respect to said drive element, a planetary gearset comprising a ring gear on the drive element, a spider on the shaft and a sun gear organized for relative rotation and joint axial movement, and a selectively operable friction brake for said sun gear including a brake operating member axially movable with and rotatable with respect to said drive member and shaft, said clutch and brake being inversely operable by the joint axial shift of the relatively rotatable shaft, drive element, driven member and sun gear.

HENRY C. HILL.